Jan. 10, 1961    J. P. FRANCIS    2,967,690
SUPPORTING BRACKETS FOR AUTOMOBILE AWNINGS
Original Filed May 7, 1957
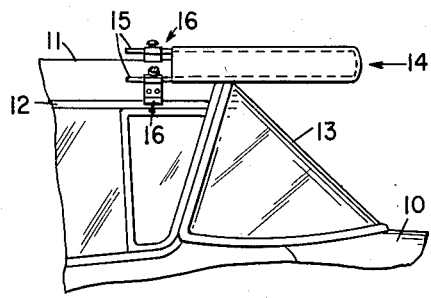
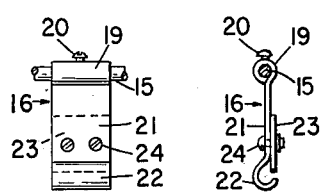
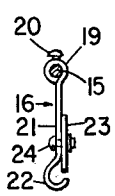
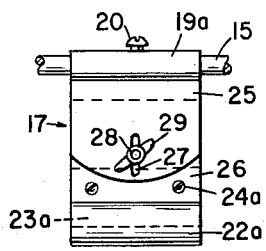
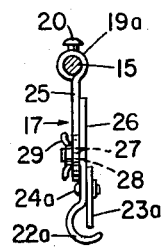
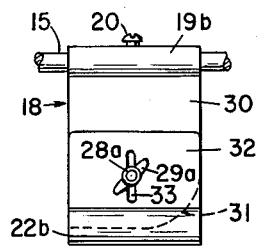
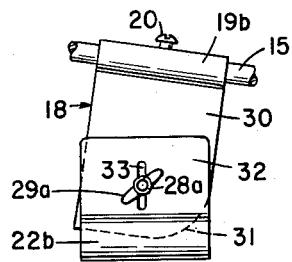
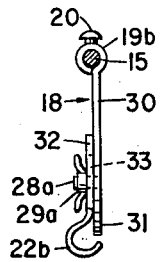
INVENTOR
John P. Francis

United States Patent Office 2,967,690
Patented Jan. 10, 1961

2,967,690

SUPPORTING BRACKETS FOR AUTOMOBILE AWNINGS

John P. Francis, 20 Boston St., Haverhill, Mass.

Original application May 7, 1957, Ser. No. 657,541, now Patent No. 2,913,211, dated Nov. 17, 1959. Divided and this application July 31, 1959, Ser. No. 836,841

2 Claims. (Cl. 248—229)

This application is a division of my copending application, Serial No. 657,541, filed May 7, 1957, now Patent Number 2,913,211, for supporting brackets for automobile awnings.

This invention relates generally to supporting brackets for supporting a windshield awning over the roof and the windshield area of an automobile, and has for an object to provide a simple fastening bracket which is very easily and quickly attached to the rain gutters and also to the supporting frame of the awning and removable therefrom in a like manner.

Another object of the invention is to provide a fastening bracket having one of the companion plate members adapted to be adjustably supported for vertical or angular adjustment, or both, thereby supporting the longitudinally adjustable windshield awning in either rain sealing engagement or in spaced relation to the roof top of the automobile.

Still another object of the invention is to provide a fastening bracket angularly adjustable whereby the windshield awning may be adjusted to cover the windshield in direct contact therewith to provide weather protection, when the vehicle is parked, against ice forming or snow collecting on the windshield area as a result of inclement weather conditions.

With these and still other objects in view, as will hereinafter more fully appear, the invention comprises certain novel constructions, combination and arrangement of parts, hereinafter described and claimed, and illustrated in the accompanying drawings, in which:

Figure 1 is a side view of a portion of an automobile top including the windshield, showing the awning supported by the fastening brackets attached to the rain gutters.

Figure 2 is a detailed side elevation view of one form of fastening bracket comprising the two companion plate members, also shown in Figure 1.

Figure 3 is a front edge elevation view of the fastening bracket shown in Figure 2.

Figure 4 is a detailed side elevation view of a modified form of an adjustable fastening bracket comprising the three companion plate members.

Figure 5 is a front edge elevation view of the fastening bracket shown in Figure 4.

Figure 6 is a detailed side elevation view of another modified form of an adjustable fastening bracket comprising the two companion plate members.

Figure 7 is similar to Figure 6, with the inner plate member shown in an angled position.

Figure 8 is a front edge elevation view of the fastening bracket as shown in Figure 6.

Referring now more specifically to the drawings, attention is directed to Figure 1, wherein numeral 14 generally indicates the windshield awning which is shown supported to a framework comprising opposing longitudinal members 15. The awning 14 is supported over the roof 11 and the windshield area 13 of an automobile 10 from the fastening brackets generally designated by the numeral 16 shown attached to the rain gutters 12.

The awning structure 14 and 15 is shown and also described in my copending application, Serial No. 476,218, filed December 20, 1954, now Patent No. 2,812,208. My invention therefore is concerned primarily with the improved fastening brackets for supporting such an awning structure for use in drive-in theatres during inclement weather, or as a permanent or semi-permanent attachment to an automobile.

In Figure 2 is shown in detailed form the fastening bracket 16, shown in Figure 1. The fastening bracket 16 comprises an inner companion plate member 23 which engages the inside of the rain gutter 12 and an outer companion plate member 21 having the lower portion 22 arcuately contoured to engage the outside of the rain gutter 12. Screws 24 engage the two companion plate members 21 and 23 together to the rain gutter 12 for the support of the said fastening bracket thereto. The extreme upper end portion of outer plate member 21 is structurally formed into a coiled portion 19 to form a longitudinal support for the longitudinal member 15. The inner plate member 23 may be structurally formed with the coiled portion 19 by extending said plate member above outer plate member 21, so that either inner plate member 23 or outer plate member 21 when extended one above the other, may be provided with the extreme upper end coiled to form the longitudinal support 19, for supporting the longitudinal frame members 15 therefrom.

A modified form of an adjustable fastening bracket generally designated by the numeral 17, Figures 4 and 5, comprises three companion plate members; inner plate member 23a which engages the inside of rain gutter 12, intermediate plate member 26 having the lower portion 22a arcuately contoured to engage the outside of rain gutter 12 and having a threaded stud member 28 attached to the upper portion of said plate member, and an adjustable outer top plate member 25 having the extreme upper end portion thereof structurally formed into a coiled portion 19a to form a longitudinal support for the longitudinal member 15 of the awning structure 14.

Adjustable outer plate member 25 is provided with an elongated slot 27, adapted to receive the threaded stud member 28, for adjustably securing the said outer plate member 25 to intermediate plate member 26 with the clamping adjustment of wing nut 29. Screws 24a engage the two companion plate members, inner plate member 23a and intermediate plate member 26 together, to the rain gutter 12 for the support of the said fastening bracket 17 thereto.

In the Figures of 4 and 5, the form of an adjustable fastening bracket 17 is provided whereby the third companion member, outer plate member 25, is adjustably supported for vertical and angular adjustment. With the vertical adjustment, awning 14, such as a fabric covered awning, may be raised and supported above the roof top 11 to provide a lateral and a longitudinal spaced opening between the roof 11 and the awning 14. When the awning 14 is lowered for vertical adjustment to provide a taut lateral friction engagement with the roof 11, rain sealing engagement is provided, whereby the windshield area 13 is protected from rain descending from the roof onto the said windshield area. Clear vision is therefore provided, when the vehicle is parked while viewing outdoor movies at drive-in theatres or other outdoor events.

In angular adjustment, the awning 14 may be adjusted angularly in relation to the windshield to provide various weather protection such as, when viewing movies at drive-in theatres, when the vehicle is in motion, and when the vehicle is parked for any length of time to protect the windshield from freezing rain or any snow accumulation thereon.

Another modified form of an adjustable fastening bracket generally designated by the numeral 18, Figures 6, 7 and 8, comprises two companion plate members 30 and 32. The outer plate member 32 has the lower portion 22b arcuately contoured to engage the outside of the rain gutter 12, and is provided with an elongated slot 33 in the upper portion of the plate which is adapted to receive the threaded stud member 28a. The outer plate member 32 is adjustably secured to inner plate member 30 with the clamping adjustment of wing nut 29a on the stud member 28a.

Inner plate member 30 has the extreme upper end portion thereof structurally formed into a coiled portion 19b to form a longitudinal support for the longitudinal member 15. The lower end portion of said plate member 30 has an arcuately contoured corner portion 31 adapted to adjustably engage the inside of the rain gutter 12, for the adjustable angular clamping engagement of said plate member 30, Figure 7, to outer plate member 32 for supporting engagement of the two said plate members to the rain gutter 12.

A thumb screw 20 is provided, preferably on the top of the coiled longitudinal supports 19, 19a or 19b, to clampingly engage the longitudinal members 15 of the awning structure. Since the awning 14 is retractable for longitudinal adjustment, the thumb screws 20 prevent any longitudinal movement or vertical vibrations due to strong winds or when the vehicle is in motion.

Referring back to the embodiment shown in Figures 1, 2 and 3, there is shown the two plate members 21 and 23 forming the complete fastening bracket 16. The improvement resides in each of the companion plate members having a central flat body portion, with the extreme upper end portion thereof of either one of the companion plate member being coiled 19 to form a longitudinal support for supporting a longitudinal frame member 15.

Referring back to the adjustable fastening bracket 17, Figures 4 and 5, a central aperture may be provided in outer plate member 25 to engage threaded stud member 28 for clamping engagement, when only the angular adjustment of said plate member 25 for supporting the awning 14 in angular relation therewith is preferred.

In the adjustable fastening bracket 18, Figures 6, 7 and 8, a central aperture may be provided on outer plate member 32 to engage threaded stud member 28a for clamping engagement, which would limit the rain gutter fastening engagement and also limit the adjustable angular movement depending upon the structural contour and size of the rain gutter on the various makes and types of automobiles.

While certain embodiments of my invention have been disclosed in the foregoing description, it will be understood that various modifications may occur to those skilled in the art. Changes, therefore, in the construction and arrangement may be made without departing from the spirit and scope of the invention as disclosed in the appended claims.

I claim:

1. A fastening bracket for adjustably supporting the retractable longitudinal frame member of a windshield awning structure, comprising a rigid vertically disposed flat companion inner plate member, a contacting rigid vertically disposed companion intermediate plate member, and a contacting rigid vertically disposed companion outer plate member having a flat body portion, said intermediate plate member having flat body portions engaging a flat body portion of said inner plate member and of said outer plate member, said intermediate plate member having an arcuately contoured bottom portion adapted to clampingly engage the outside of the rain gutter of an automobile, the said inner plate member and the said intermediate plate member adapted to engage repectively the inside and the outside of the said rain gutter, said inner plate member and said intermediate plate member being connected together by clamping bolt means, said companion outer plate member having a coiled longitudinal portion forming a fully circular longitudinal support for encompassing and rigidly supporting the frame member at the uppermost end portion above the said vertically flat portion of said outer plate member, and a clamping pivotal bolt member extending from the said intermediate plate member and adjustably connecting the said outer plate member to said companion intermediate plate member, said outer plate member being adjustably supported for forward and rearward angular clamping adjustment from the said clamping pivotal bolt member.

2. A fastening bracket for adjustably supporting the retractable longitudinal frame member of a windshield awning structure as defined in claim 1, wherein an elongated slot is provided in said outer plate member to adjustably engage the said extending clamping pivotal bolt member for vertical and the said angular adjustment of said adjustably connected outer plate member.

References Cited in the file of this patent

UNITED STATES PATENTS

| | | |
|---|---|---|
| 670,904 | Pittman | Mar. 26, 1901 |
| 1,176,203 | Comer | Mar. 21, 1916 |
| 1,674,538 | Williams | June 19, 1928 |
| 1,790,610 | Vindal | Jan. 27, 1931 |